US012585227B2

(12) United States Patent
Patton et al.

(10) Patent No.: US 12,585,227 B2
(45) Date of Patent: Mar. 24, 2026

(54) CLOCK DEVICE WITH AUTOMATIC SIMULATION OF SUNRISE OR SUNSET

(71) Applicant: Lutron Technology Company LLC, Coopersburg, PA (US)

(72) Inventors: Erica Patton, Reading, PA (US); Daniel Raneri, Orefield, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 8 days.

(21) Appl. No.: 18/182,645

(22) Filed: Mar. 13, 2023

(65) Prior Publication Data

US 2023/0213892 A1 Jul. 6, 2023

Related U.S. Application Data

(63) Continuation of application No. 16/983,602, filed on Aug. 3, 2020, now Pat. No. 11,604,438, which is a (Continued)

(51) Int. Cl.
| | |
|---|---|
| *G04C 19/00* | (2006.01) |
| *E06B 9/32* | (2006.01) |
| *E06B 9/38* | (2006.01) |
| *E06B 9/42* | (2006.01) |
| *E06B 9/68* | (2006.01) |

(Continued)

(52) U.S. Cl.
CPC ............... *G04C 19/00* (2013.01); *E06B 9/32* (2013.01); *E06B 9/38* (2013.01); *E06B 9/42* (2013.01); *E06B 9/68* (2013.01); *E06B 9/90* (2013.01); *G04C 21/12* (2013.01); *G04C 23/18* (2013.01); *G04C 23/38* (2013.01);

*G04G 15/00* (2013.01); *G04G 15/006* (2013.01); *G04G 21/00* (2013.01); *G04G 21/04* (2013.01); *H05B 47/11* (2020.01); *H05B 47/16* (2020.01); *E06B 2009/6809* (2013.01); *E06B 2009/6827* (2013.01); *E06B 2009/6845* (2013.01);

(Continued)

(58) Field of Classification Search
CPC ................................ G04G 15/00; G04G 21/04
See application file for complete search history.

(56) References Cited

U.S. PATENT DOCUMENTS

| | | |
|---|---|---|
| 4,712,104 A | 12/1987 | Kobayashi |
| 5,371,447 A | 12/1994 | Boss |

(Continued)

OTHER PUBLICATIONS http://www.alarmclocksonline.com/SunriseCreator.htm—Jun. 5, 2012.

(Continued)

*Primary Examiner* — Edwin A. Leon
*Assistant Examiner* — Jason M Collins
(74) *Attorney, Agent, or Firm* — Michael S. Czarnecki; Glen R. Farbanish; Philip N. Smith

(57) ABSTRACT

A clock comprises an alarm clock housing having a front face, a clock display occupying at least a portion of the front face, a control on the housing for activating a shade positioning function, and a processor within the housing. The processor is responsive to the control for generating at least one shade positioning command to be transmitted to at least one motorized window shade, so as to cause the motorized window shade to move to one or more position at one or more corresponding predetermined interval relative to an alarm time.

24 Claims, 13 Drawing Sheets

Related U.S. Application Data continuation of application No. 16/207,361, filed on Dec. 3, 2018, now Pat. No. 10,732,575, which is a continuation of application No. 15/620,145, filed on Jun. 12, 2017, now Pat. No. 10,146,187, which is a continuation of application No. 15/249,788, filed on Aug. 29, 2016, now Pat. No. 9,678,480, which is a continuation of application No. 14/887,408, filed on Oct. 20, 2015, now Pat. No. 9,429,917, which is a continuation of application No. 13/838,708, filed on Mar. 15, 2013, now Pat. No. 9,195,220.

(51) Int. Cl.

| | | |
|---|---|---|
| *E06B 9/90* | (2006.01) | |
| *G04C 21/12* | (2006.01) | |
| *G04C 23/18* | (2006.01) | |
| *G04C 23/38* | (2006.01) | |
| *G04G 15/00* | (2006.01) | |
| *G04G 21/00* | (2010.01) | |
| *G04G 21/04* | (2013.01) | |
| *H05B 47/11* | (2020.01) | |
| *H05B 47/16* | (2020.01) | |

(52) U.S. Cl.
CPC ....... *E06B 2009/6872* (2013.01); *Y02A 30/24* (2018.01); *Y02B 80/00* (2013.01)

(56) References Cited

U.S. PATENT DOCUMENTS

| | | | |
|---|---|---|---|
| 5,832,067 | A | 11/1998 | Herold |
| 6,024,156 | A | 2/2000 | Chu |
| 6,283,190 | B1 | 9/2001 | Hu et al. |
| 6,902,296 | B2 | 6/2005 | Searfoss, III |
| 7,085,627 | B2 | 8/2006 | Bamberger et al. |
| 7,280,439 | B1 | 10/2007 | Shaddox |
| 7,417,397 | B2 | 8/2008 | Berman et al. |
| 7,635,018 | B2 | 12/2009 | Carmen, Jr. et al. |
| 8,104,917 | B2 * | 1/2012 | Link ................... H05B 47/155 |
| | | | 345/82 |
| 8,723,466 | B2 | 5/2014 | Chambers et al. |
| 9,195,220 | B2 | 11/2015 | Patton et al. |
| 9,429,917 | B2 | 8/2016 | Patton et al. |
| 9,678,480 | B2 | 6/2017 | Patton et al. |
| 10,146,187 | B2 | 12/2018 | Patton et al. |
| 10,732,575 | B2 | 8/2020 | Patton et al. |
| 2005/0110416 | A1 * | 5/2005 | Veskovic ................. E06B 9/68 |
| | | | 315/149 |
| 2005/0189078 | A1 | 9/2005 | Whiting |
| 2008/0236763 | A1 | 10/2008 | Kates |
| 2011/0102879 | A1 * | 5/2011 | De Ruijter .......... G02B 6/0095 |
| | | | 359/290 |
| 2011/0240232 | A1 * | 10/2011 | Kluck ..................... E05F 15/79 |
| | | | 160/5 |
| 2011/0310706 | A1 | 12/2011 | Kim |
| 2012/0095601 | A1 | 4/2012 | Abraham et al. |
| 2012/0193035 | A1 | 8/2012 | Malekpour |
| 2013/0067480 | A1 * | 3/2013 | Mullet ..................... E06B 9/68 |
| | | | 718/102 |
| 2013/0208576 | A1 * | 8/2013 | Loree, IV ............. G04G 11/00 |
| | | | 368/256 |
| 2014/0203166 | A1 | 7/2014 | Betz |
| 2015/0204561 | A1 * | 7/2015 | Sadwick ................. F24F 11/33 |
| | | | 236/1 C |
| 2016/0002974 | A1 * | 1/2016 | Boyle .................... E06B 9/386 |
| | | | 160/173 R |
| 2018/0355662 | A1 * | 12/2018 | Hall ....................... G04C 23/18 |

OTHER PUBLICATIONS http://www.usa.phillips.com/c/light-therapy/dock-for-iphone-ipod-hf3490_60/prd/en/, 2004-2012, 2 pages.

http://www.usa.phillips.com/c/light-therapy/usb-playback-and-dusk-simulation-hf3485_60/prd/em/, 2007, 4 pages.

http://www.morningsunrise.com/products.php?content=detail&code=SRS320, Sep. 2, 2012, 3 pages.

http://www.amazon.com/Morning-Sunrise-System-Alarm-SRS100US/dp/B000GG327G. Jan. 2007, 3 pages.

* cited by examiner

FIG. 9

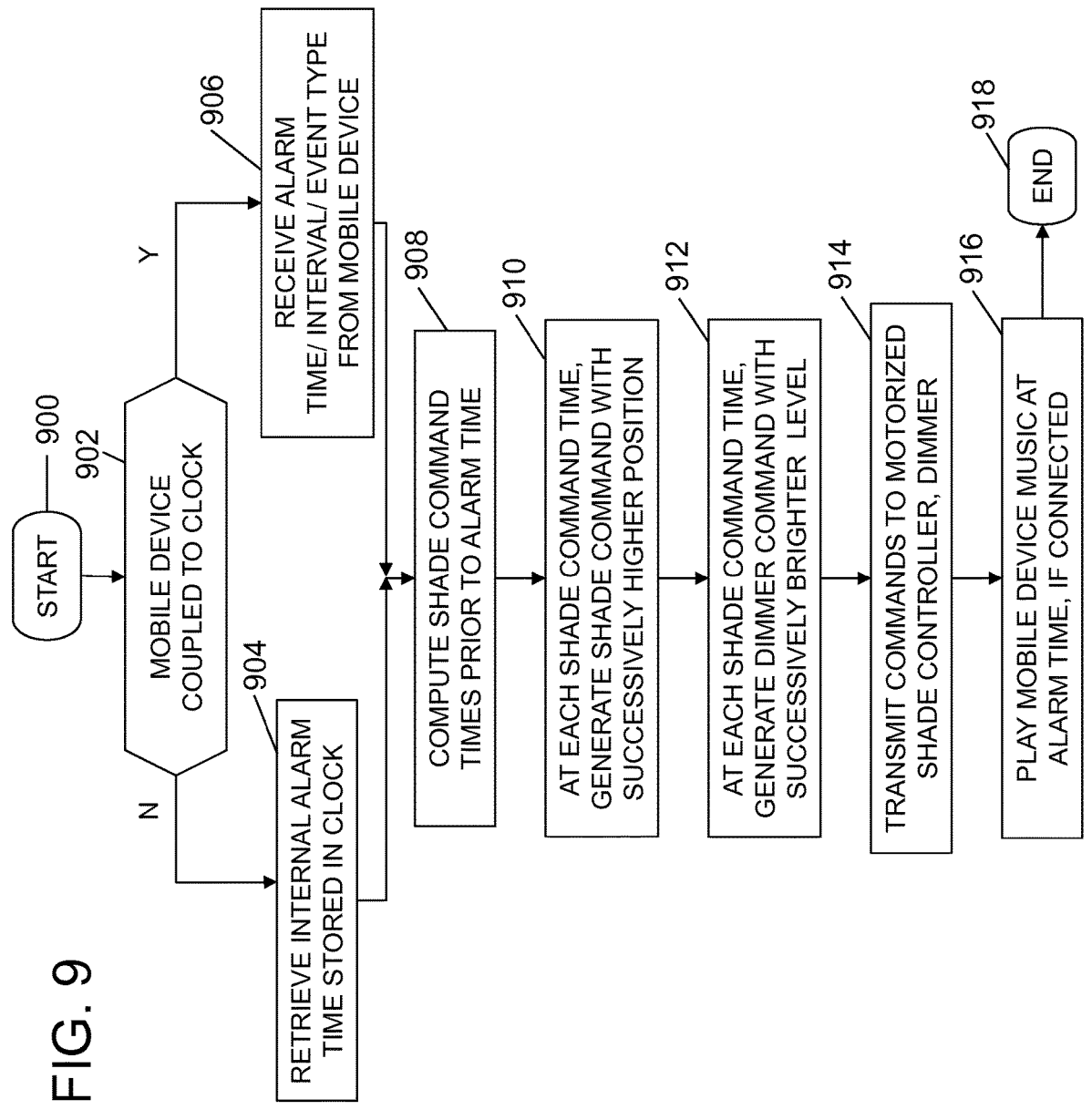

START — 900

902 — MOBILE DEVICE COUPLED TO CLOCK

Y

N

906 — RECEIVE ALARM TIME/ INTERVAL/ EVENT TYPE FROM MOBILE DEVICE

904 — RETRIEVE INTERNAL ALARM TIME STORED IN CLOCK

908 — COMPUTE SHADE COMMAND TIMES PRIOR TO ALARM TIME

910 — AT EACH SHADE COMMAND TIME, GENERATE SHADE COMMAND WITH SUCCESSIVELY HIGHER POSITION

912 — AT EACH SHADE COMMAND TIME, GENERATE DIMMER COMMAND WITH SUCCESSIVELY BRIGHTER LEVEL

914 — TRANSMIT COMMANDS TO MOTORIZED SHADE CONTROLLER, DIMMER

916 — PLAY MOBILE DEVICE MUSIC AT ALARM TIME, IF CONNECTED

END — 918

FIG. 11

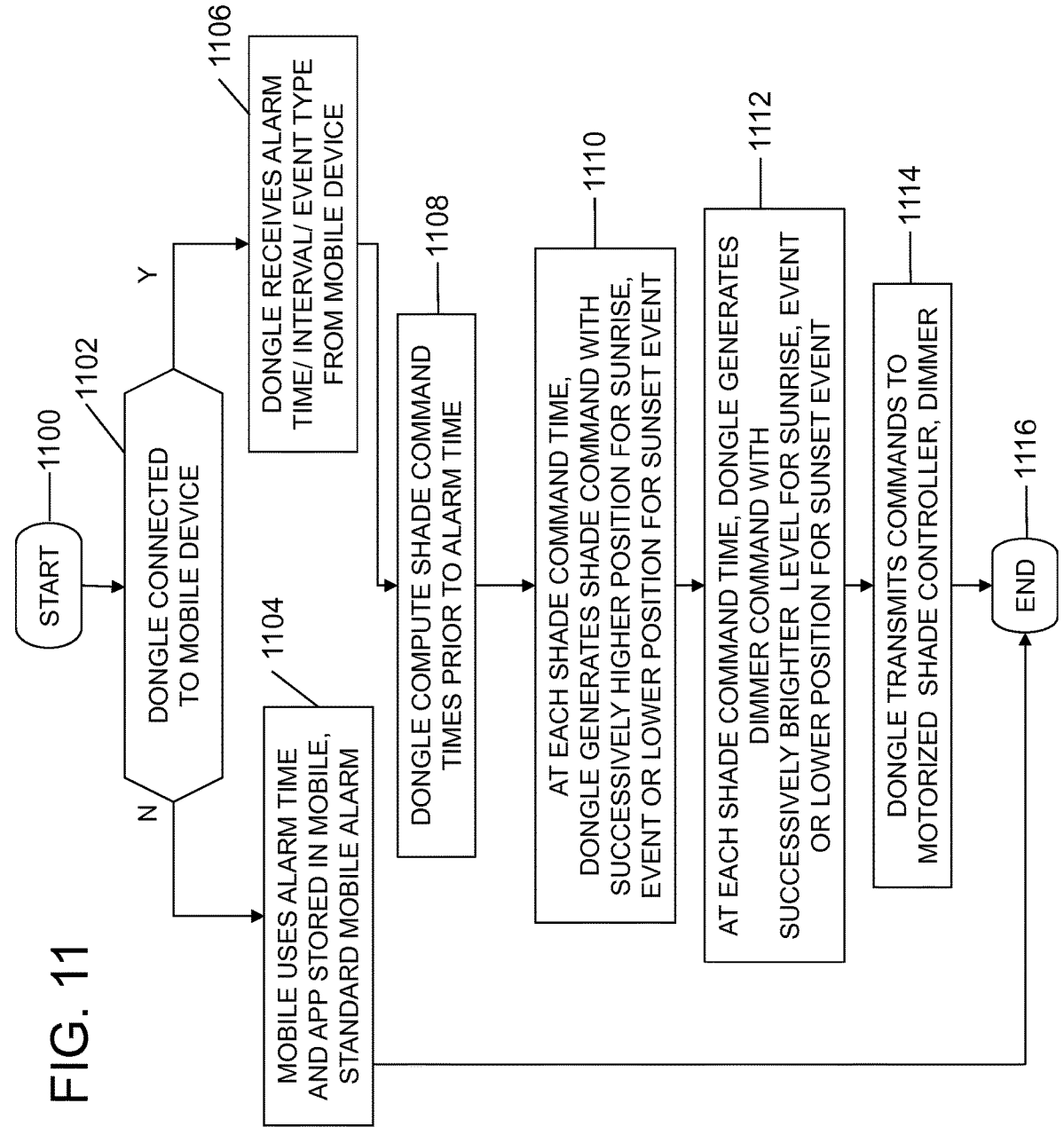

START — 1100

DONGLE CONNECTED TO MOBILE DEVICE — 1102

N — MOBILE USES ALARM TIME AND APP STORED IN MOBILE, STANDARD MOBILE ALARM — 1104

Y — DONGLE RECEIVES ALARM TIME/ INTERVAL/ EVENT TYPE FROM MOBILE DEVICE — 1106

DONGLE COMPUTE SHADE COMMAND TIMES PRIOR TO ALARM TIME — 1108

AT EACH SHADE COMMAND TIME, DONGLE GENERATES SHADE COMMAND WITH SUCCESSIVELY HIGHER POSITION FOR SUNRISE, EVENT OR LOWER POSITION FOR SUNSET EVENT — 1110

AT EACH SHADE COMMAND TIME, DONGLE GENERATES DIMMER COMMAND WITH SUCCESSIVELY BRIGHTER LEVEL FOR SUNRISE, EVENT OR LOWER POSITION FOR SUNSET EVENT — 1112

DONGLE TRANSMITS COMMANDS TO MOTORIZED SHADE CONTROLLER, DIMMER — 1114

END — 1116

CLOCK DEVICE WITH AUTOMATIC SIMULATION OF SUNRISE OR SUNSET

This application is a continuation of U.S. patent application Ser. No. 16/983,602, filed Aug. 3, 2020; which is a continuation of U.S. patent application Ser. No. 16/207,361, filed Dec. 13, 2018, now U.S. Pat. No. 10,732,575, issued Aug. 4, 2020; which is a continuation of U.S. patent application Ser. No. 15/620,145, filed Jun. 12, 2017, now U.S. Pat. No. 10,146,187, issued Dec. 4, 2018; which is a continuation of U.S. patent application Ser. No. 15/249,788, filed Aug. 29, 2016, now U.S. Pat. No. 9,678,480, issued Jun. 13, 2017; which is a continuation of U.S. patent application Ser. No. 14/887,408, filed Oct. 20, 2015, now U.S. Pat. No. 9,429,917, issued Aug. 30, 2016; which is a continuation of U.S. patent application Ser. No. 13/838,708, filed Mar. 15, 2013, now U.S. Pat. No. 9,195,220, issued Nov. 24, 2015, which are expressly incorporated by reference herein in their entireties.

FIELD

This disclosure relates to consumer electronics generally, and more particularly to alarm clocks.

BACKGROUND

Alarm clocks are ubiquitous and inexpensive. Efforts have been made to improve the basic alarm, because many individuals find the audible alarm annoying. For example, U.S. Pat. No. 7,280,439 describes a "countermeasure for circadian and sleep disruption as caused by a traditional alarm clock." It incorporates a lighting system at the alarm clock that, prior to the preset waking time, will emit a light that gradually increases in intensity as it changes the ultraviolet spectrum of light it emits, so as to simulate the rising sun.

Improved alarm clocks are desired.

SUMMARY

In some embodiments, a clock, comprises an alarm clock housing having a front face, a clock display occupying at least a portion of the front face, a control on the housing for activating a shade positioning function, and a processor within the housing. The processor is responsive to the control for generating at least one shade positioning command to be transmitted to at least one motorized window shade, so as to cause the motorized window shade to move to one or more position at one or more corresponding predetermined interval relative to an alarm time.

In some embodiments, a clock comprises an alarm clock housing having a front face. A clock display occupies at least a portion of the front face. A first control is provided on the housing for setting an alarm time. A second control is provided on the housing for activating a command sequence. A processor within the housing is responsive to the second control for generating the command sequence, including at least two shade positioning commands to be transmitted wirelessly to at least one motorized window shade at respective transmission times, so as to cause the motorized window shade to move to respective increasingly open positions at one or more predetermined interval relative to the alarm time. A first wireless communications interface within the housing and coupled to the processor for transmitting the command sequence to the motorized window shade.

In some embodiments, a clock, comprises an alarm clock housing having a front face. A clock display occupies at least a portion of the front face. A first control on the housing for setting an event time. A second control is provided on the housing. A processor within the housing is responsive to actuation of the second control for generating a command sequence including at least two shade positioning commands to be transmitted wirelessly to at least one motorized window shade at respective transmission times, so as to cause the motorized window shade to move to respective increasingly closed positions at one or more predetermined interval relative to the event time. A first wireless communications interface is provided within the housing and coupled to the processor for transmitting the command sequence to the motorized window shade.

In some embodiments, apparatus comprises a mobile device configured with an alarm clock function capable of receiving an input alarm time, the mobile device having an input/output (I/O) port or earphone port, and a dongle. The dongle comprises a connector adapted to connect to the I/O port or earphone port of the mobile device and communicate with the mobile device, a radio frequency (RF) transceiver, an RF antenna coupled to the RF transceiver, and a processor coupled to the connector and the RF transceiver. The processor is configured to receive the alarm time from the mobile device, and generate at least one shade positioning command to be transmitted to at least one motorized window shade via the RF transceiver and the RF antenna, so as to cause the motorized window shade to move to one or more position at one or more corresponding predetermined interval relative to the alarm time.

BRIEF DESCRIPTION OF THE DRAWINGS

FIG. 3 and FIGS. 3A-3G are diagrams showing operation of shades and lights by the clock of FIG. 1 at several instants in time.

FIG. 9 is a flow chart of a method performed by the clock of FIG. 7 or FIG. 8.

FIG. 11 is a flow chart of a method performed using the apparatus of FIG. 10.

DETAILED DESCRIPTION

Figure 1A:
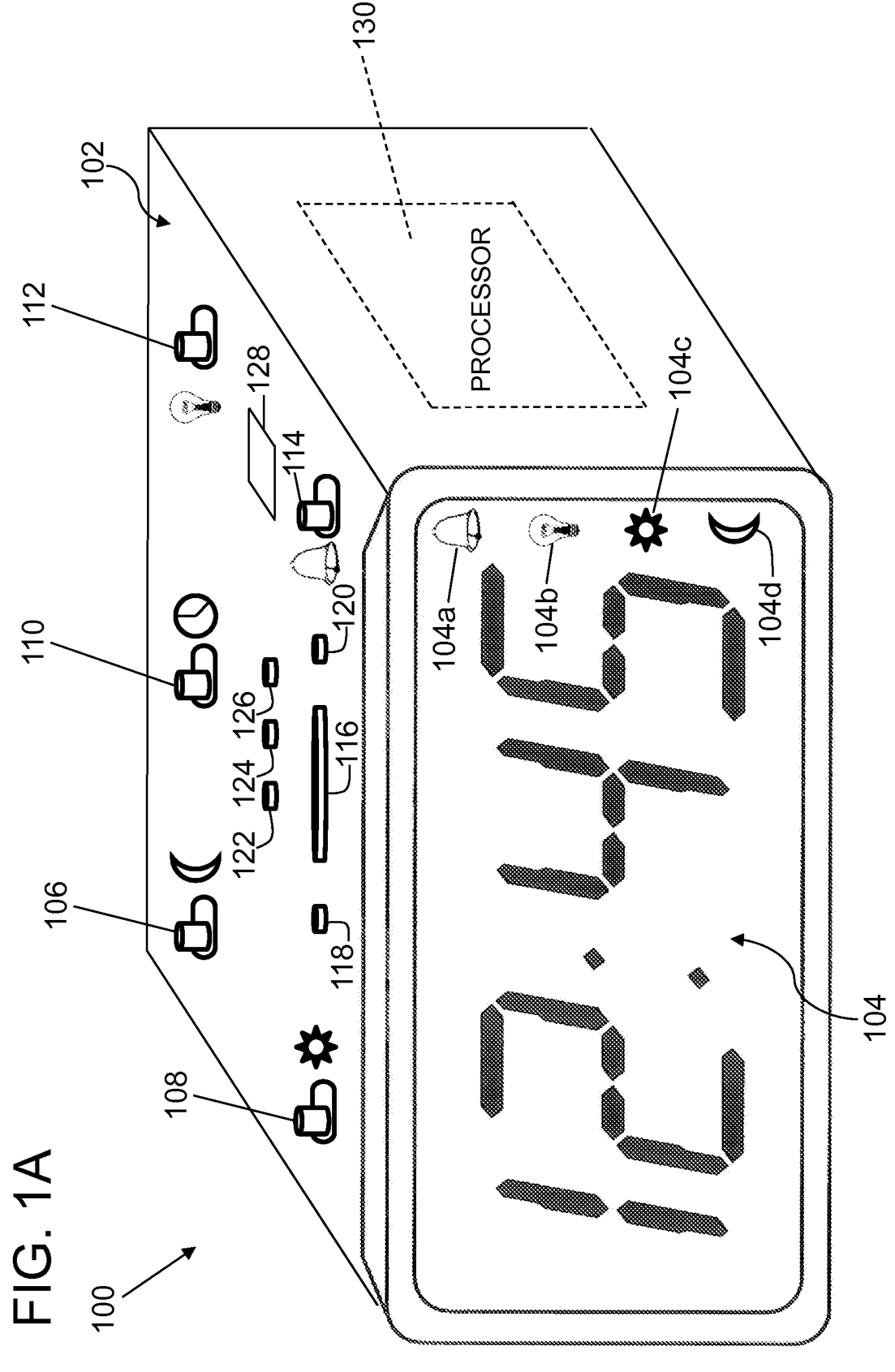
FIG. 1A is an isometric view of a clock according to one embodiment.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

This disclosure describes an alarm clock which simulates a natural sunrise to gently wake a user before or at the alarm time by gradually opening one or more window shades during a predetermined period (e.g., 10, 20, or 30 minutes, or other user selected value) before the alarm time. In some embodiments, fallback mechanisms (which may include lights and/or an audible alarm), are provided to ensure that the user is awakened even if the sky is very dark and the natural light levels are low. The clock is a portable, self-contained, free-standing unit that does not require any wiring, and can easily be activated by a homeowner without any special tools.

FIG. 1A is an isometric view of a first embodiment of clock 100. The clock 100 comprises an alarm clock housing 102 having a front face 104. A clock display occupies at least a portion of the front face 104. In some embodiments, the clock display occupies a portion of the front face, such as about 25% of the area of the front face or more. In some embodiments, the clock display occupies about 50% of the area of the front face or more. In other embodiments the clock display occupies a smaller or larger fraction of the front face area. In various embodiments, the clock display can have any of a variety of formats, such as a digital readout, as shown in FIG. 1A, or an analog clock having actual or simulated clock hands (where simulated hands are formed by a liquid crystal display or light emitting diode display of polygons positioned to show the time according to a 12-hour or 24-hour analog clock format. In other embodiments, the clock display can use varied colors and/or brightness.

The housing 102 of the clock 100 has several controls. In various embodiments, any of the controls can be located on any face of the clock according to principles of ergonomics, ease of use, and aesthetics. The placement of all controls on the top in FIG. 1A is only an example and is not limiting. Similarly, the use of toggle switches and buttons in FIG. 1A are only exemplary, and each control can be any of any type.

In some embodiments, the control 110 is used to toggle between setting the time of the clock 100 (when the control 110 is in a first position) and setting the alarm time (when the control 110 is in a second position). The clock time or alarm time is set using controls 122 and 124. In some embodiments, controls 122 and 124 are provided for setting the minute and hour. In some embodiments, a third control 126 is used to select the direction (positive or negative) of the minute or hour readout while setting the time. In other embodiments, the third control 126 may be used to toggle between the primary time zone and a second time zone, or between standard time and daylight savings time. The alarm time entered using the controls 110, 122 and 124 is stored in a non-transitory storage medium within the housing 102 of clock 100.

Figure 8:
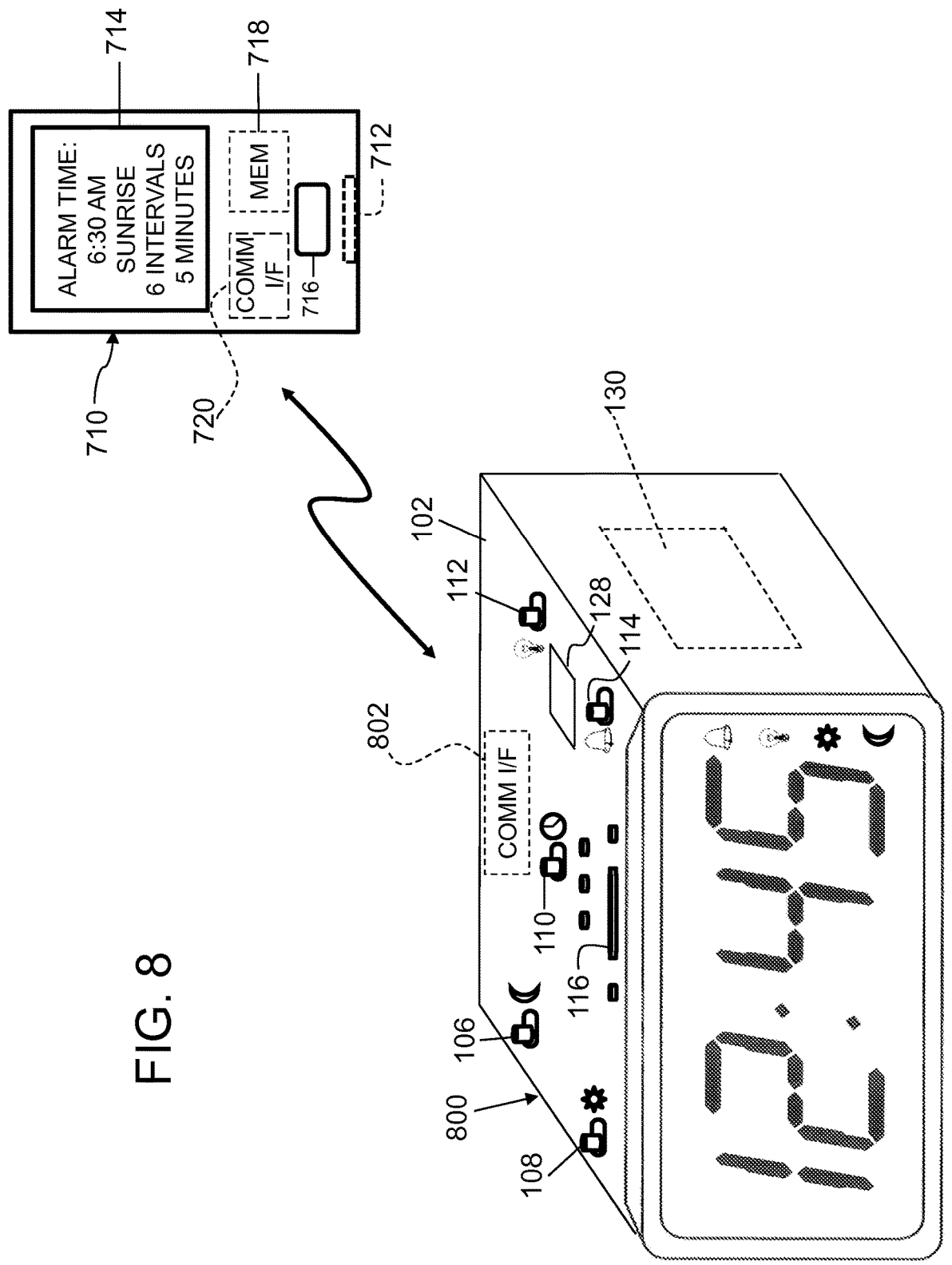
FIG. 8 is an isometric view of an embodiment of the clock with a wireless interface for communication with a mobile device.

In other embodiments, control 126 is used to initiate an association process, wherein a processor 130 is responsive to actuation of the third control 126 for associating the clock 100 with a device that is transmitting an association data sequence. For example, the clock 100 can be located within the same room as a device, such as a motorized shade electronic drive unit (EDU) 206 (FIG. 2), a dimmer 220 (FIG. 2) or a mobile device 710 (FIG. 8). By associating the clock 100 with a motorized window shade EDU 206 and/or processor controlled dimmer 220, the shade and/or dimmer become responsive to commands generated and transmitted by the clock 100. Association provides a procedure to link these devices. The processor 130 can be configured to perform associations with devices which issue compatible data streams according to a predetermined message and communications protocol, such as the "CLEAR CONNECT®" protocol used in automatic controls sold by Lutron Electronics Co., Inc. In other embodiments, the association control can be an additional control button (not shown) on the back of the clock 100, or in another location where it is not likely to be unintentionally actuated.

In some embodiments, the clock 100 has at least one control 106 and/or 108 on the housing 102 for activating a shade positioning function described below. In FIG. 1A a sunrise event control 108 and a sunset event control 106 are provided. In some embodiments, sunrise event control 108 and sunset event control 106 operate as individual toggles, either or both of which can be activated at any given time.

The clock 100 has a processor 130 within the housing 102. The processor 130 is responsive to the control 106 or 108 for generating at least one shade positioning command to be transmitted to at least one motorized window shade 204 (FIG. 2), so as to cause the motorized window shade to move to one or more position at one or more corresponding predetermined interval relative to an alarm time.

In some embodiments, the at least one shade positioning command includes a single command to cause the shade to gradually open or gradually close at a predetermined average rate. For example, when the sunrise event control 108 is set, the shade positioning command can cause the shade to rotate so that the hem bar (bottom) of the shade fabric moves at a constant linear speed for a predetermined period of time, or until the shade reaches a fully opened position. Methods and apparatus for causing the shade to move with constant linear speed are described in U.S. Pat. No. 7,635,018, entitled "System for controlling a roller shade fabric to a desired linear speed," which is incorporated herein by reference. In other embodiments, the command can cause the shade to rotate with an average rotational speed. The processor can accept the period of time as a user input, or use a default period stored in a non-transitory storage medium within the clock. If the user inputs the period of time, the shade positioning command includes the period of time and/or average linear speed; the EDU 206 of the motorized shade contains a processor capable of computing the rotational speed at which the shade will turn. In other embodiments, the processor can calculate the speed at which the motor of the shade 204 is to turn (taking into account the change in diameter of the fabric roll as it is wound or unwound).

In some embodiments, the processor is configured to generate a command sequence including a plurality of shade positioning commands to be transmitted at respective transmission times to cause the motorized shade to move to respectively different positions, so as to gradually open or gradually close the shade.

The clock 100 has a control 114 for turning on an audible alarm at the alarm time that has been set using controls 110, 122 and 124. In some embodiments, the alarm control causes the audible alarm to be emitted at the alarm time entered by the user in a conventional manner. In some embodiments, if the alarm control 114 and the sunrise event control 108 are both activated, the action of the alarm control 114 is modified. For example, in some embodiments, the audible alarm is delayed until passage of a predetermined interval after the alarm time, and the audible alarm does not emit sound if the user turns off the alarm control between the alarm time and the end of the predetermined interval.

Control 116 is a snooze button. If the audible alarm control 114 is activated, but the sunrise event control 108 is not activated, the snooze button 116 performs a conventional function of interrupting the audible alarm for a predetermined period, and then resuming the audible alarm. However, if the sunrise event control 108 is activated, the function of the snooze control 114 is modified, as described below with reference to FIG. 6.

In some embodiments, controls 118 and 120 can be additional "short snooze" buttons for interrupting the audible alarm for shorter predetermined periods. In other embodiments, buttons 118 and 120 provide other functions, either to assist in programming a sunrise event or a sunset event. For example, in some embodiments, buttons 118 and 120 (or other equivalent controls) are used for inputting the number of shade moving operation(s) and/or the length of the interval between the start of each successive shade movement.

In some embodiments, a light control 112 is provided on the housing. If the sunrise event control 108 and light control 112 are both set, then during the sunrise event, in addition to controlling the shades, the clock 100 issues dimmer commands to a processor controlled dimmer 220 (FIG. 2), such as a "MAESTRO®" switch and dimmer control sold by Lutron Electronics Co., Inc. of Coopersburg, PA. The functions performed when the light control 112 is activated during a sunrise event are described below with reference to FIG. 5.

In some embodiments, the clock 100 has a light level sensor 128 on the housing. During a sunrise event, if the illumination levels are lower than a predetermined threshold value, the clock can reactively issue light commands to a processor controlled switch/dimmer 220. The light level adjustments are not required to be performed at the same time as the shade adjustments. In some embodiments, the processor 130 is responsive to the light level signal from sensor 128 for determining at a predetermined interval after transmitting each respective shade positioning command whether a light level is lower than a threshold value, and transmitting a respective dimmer command to a wireless dimmer if the light level is lower than the threshold. The dimmer command can cause the dimmer 220 to gradually increase the light level. In some embodiments, the dimmer command causes the light level to initially switch from an off state to an intermediate or bright level.

The clock also has an embedded processor 130. The processor has a tangible, non-transitory storage medium (not shown) containing the computer program instructions for operating the clock as described herein. The functions performed by the processor during the sunrise and sunset events are described below with reference to FIGS. 4, 5, 6, 9 and 11.

In some embodiments, the clock face 104 includes indicators 104a-104d which indicate which of the audible alarm, lighting, sunrise event and sunset event controls are activated.

Figure 1B:
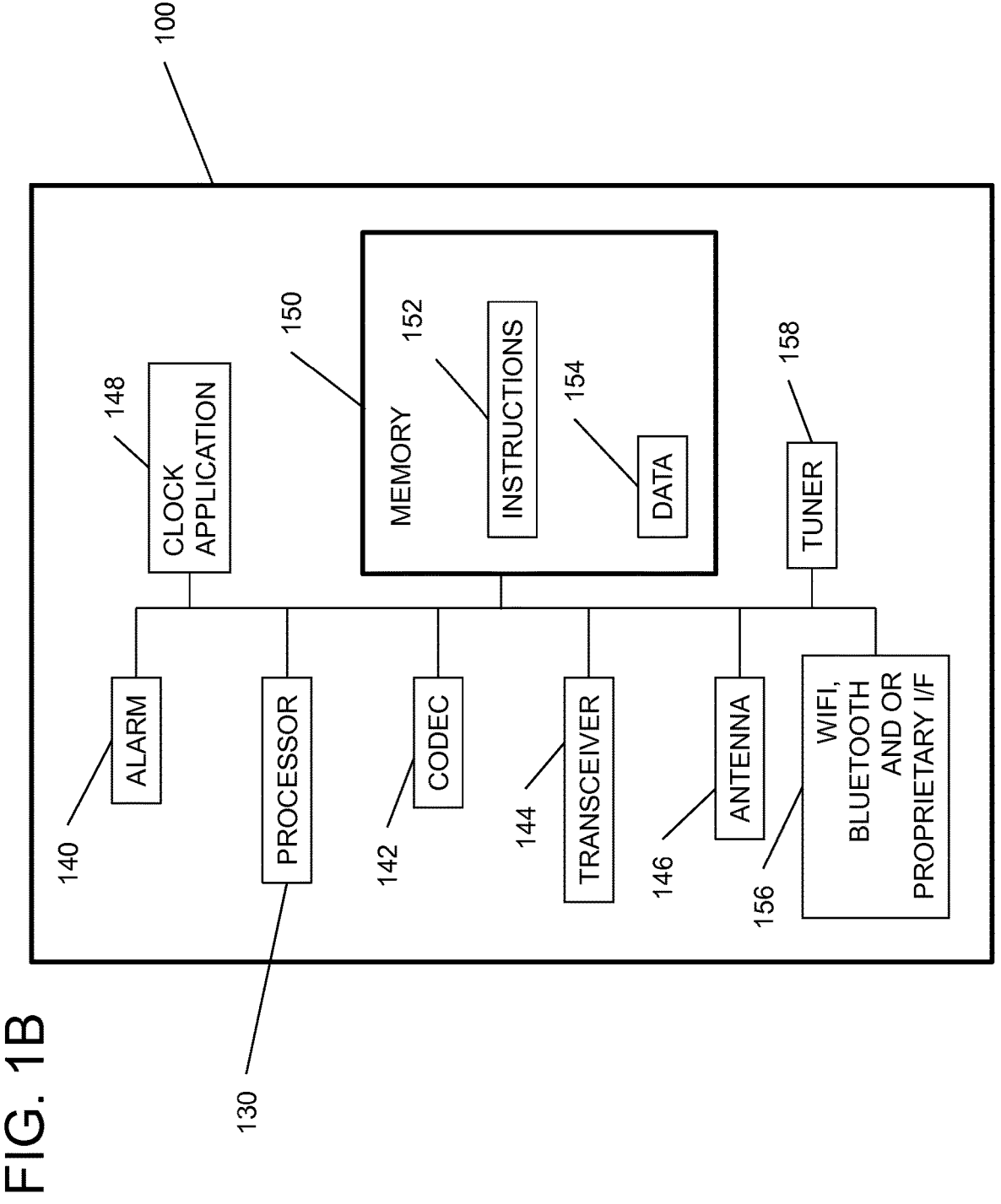
FIG. 1B is a block diagram of the clock of FIG. 1.

FIG. 1B is a simplified block diagram of the clock 100. The alarm clock functions are provided by the clock module 148. As understood by one of ordinary skill, the processor 130 has a separate timing clock (not shown) which synchronizes actions of the digital logic elements; the timing clock is omitted from FIG. 1B to avoid confusion. The processor 130 has a non-transitory storage medium 150, which includes instruction storage area 152 and data storage area 154. The clock 100 has an audio alarm 148, such as a buzzer, which is capable of gradually increasing in volume. A codec 142 is provided to encode command sequences to be transmitted to the motorized shade 204 and switch/dimmer 220. A transceiver 144 and RF antenna 146 provide an RF communications path for transmitting and receiving these command sequences.

In some embodiments, the clock 100 has an additional wireless communications interface 156 within the housing and coupled to the processor for transmitting the command sequence to the motorized window shade 206, a processor controlled switch/dimmer 220. The additional wireless communications interface 156 may be an 802.11 (WiFi) interface, a Bluetooth interface, or a proprietary interface.

In some embodiments, a radio tuner 158 is provided, permitting the clock to be used as a clock-radio.

Figure 2:
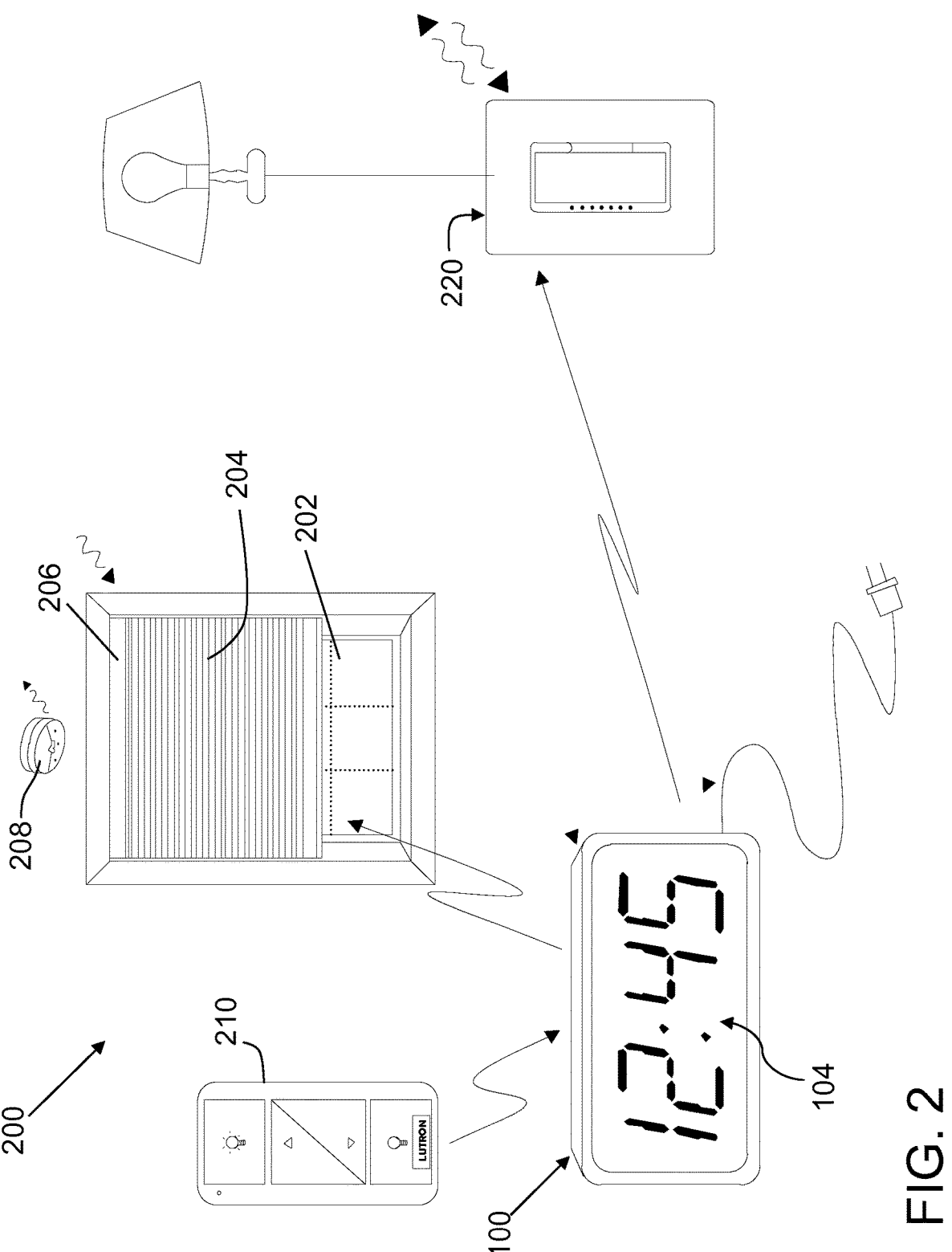
FIG. 2 is a schematic diagram of an environment in which the clock operates.

FIG. 2 shows a non-limiting example of a control environment in which the clock can be used. Although FIG. 2 shows a cord and plug, the clock 100 can operate on batteries, or the clock can operate on AC current with battery backup. In addition to the clock 100, at least one window 202 or skylight of the room (in which the clock is located) has a motorized window shade 204 with an electronic drive unit EDU 206 containing an antenna, an RF receiver, a motor controller, and a motor. The motor can be either an AC or DC motor. The motor controller of EDU 206 is configured to receive signals from the clock 100 representing shade commands by way of the antenna and the RF receiver, and transmit signals to operate the motor. In some embodiments, the commands identify a shade position or a number of rotations of the shade roller, for moving the hembar of the shade to a predetermined position. In other embodiments, the commands identify an average rotational velocity at which the motor is to turn.

The clock 100 is capable of issuing commands to a processor controlled switch/dimmer 220, such as "MAESTRO®" switch and dimmer control sold by Lutron Electronics Co., Inc. The switch/dimmer 220 is responsive to the commands issued by the clock 100 to turn the electric light 218 on (or off), or gradually increase (or decrease) brightness of the light 218 over a period of time.

In some embodiments, the room is equipped with a light sensor 208 which allows the clock 100 to remotely detect the ambient lighting level in the room. In some embodiments, the clock 100 can use the lighting level information provided by the sensor 208 to control the gradual increase in supplemental illumination by electrical lights during a sunrise event, to achieve one or more desired illumination levels during the sunrise event. The illumination measurements from light sensor 208 can be used in place of the light sensor 128, particularly if the clock 100 is very close to an electrical light, and the user wishes to control the average light level in the room during the sunrise event. In some embodiments, the light sensor 208 is adapted to be mounted on or adjacent to a window, and the light sensor 208 has a wireless communications interface for communicating with the processor 130 via the first wireless communications interface.

The clock 100 is also capable of receiving inputs from other sensors and controls. In some embodiments, the clock accepts remote control signals from a remote control unit 210, such as the "PILO®" wireless control sold by Lutron Electronics Co., Inc. During a sunrise event as described with reference to FIG. 6, the snooze button 116 can be pressed directly, or a user can use a remote control to issue a "snooze" signal to the clock 100. The processor 130 responds to receipt of the snooze signal from remote control unit 210 in the same way as it responds to depression of the snooze button 116.

Figure 3:
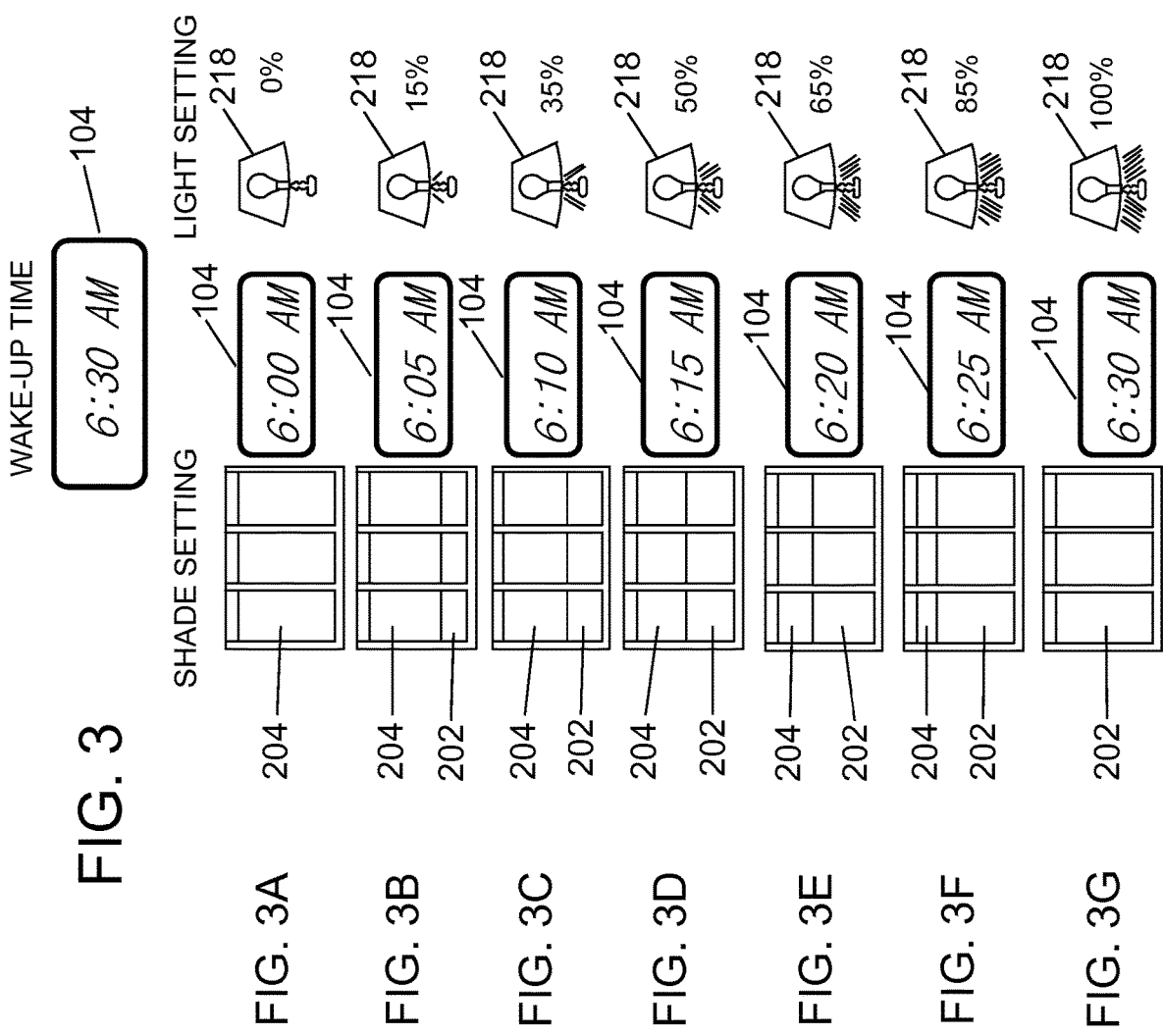

FIGS. 3 to 3G show a non-limiting example of a simulated sunrise event. In FIG. 3, the user has input an alarm time of 6:30 AM. It will be understand that the alarm time, the time at which the sunrise event begins, the number of shade movements in the sunrise event, and the length of each interval can be varied, and in some embodiments are selected by user inputs.

In FIG. 3A, up until the first shade control command is issued, the shade 204 is in the fully closed position. In this example, the clock 100 is configured or programmed by a user input value to perform a simulated sunrise event beginning one half hour before the alarm time. In some embodiments, the shade positioning command sequence is a single command to continuously move the motor to raise the shade at an average rotational speed to a fully open position within one half hour before the alarm time; or the gradual opening begins at 6:00; FIGS. 3A to 3G show the state of the shade 204 and window 202 at various times in the half hour period. In some embodiments, if the user activates lighting control in addition to the sunset event control, the clock 100 issues one or more dimmer/switch commands to a processor controlled dimmer switch to gradually increase the brightness of electrical lights controlled by the dimmer switch. The dimmer/switch commands can either cause continuous gradual increase in illumination throughout the period of the sunrise event, or stepwise increases in illumination.

In other embodiments, the clock 100 performs a simulated sunrise event by issuing a plurality of shade positioning commands to move the shade to discrete positions at discrete times. For example, FIGS. 3A to 3G show the state of the shade 204 and window 202 if the shade positioning commands instruct the motorized shade 204 to move so that the shade is open 20%, 40%, 60% 80% and 100% of its opening range, respectively at the end of each of six equal time intervals before the alarm time. In some embodiments, the length of the interval can be a user input value. In other embodiments, if no interval length is input, a default value (e.g., 5 minutes) is used as the length of the interval.

In some embodiments, both the shade movements and the electric light increase are performed in discrete steps. In some embodiments, shades are moved gradually or continuously, while the lights are brightened in discrete steps. In other embodiments, shades are moved in discrete steps, while the lights are brightened gradually or continuously. In some embodiments, both shade movements and electric light increase are performed gradually or continuously.

This disclosure also describes an alarm clock which simulates a natural sunset to gradually close one or more window shades during a predetermined period (e.g., 30 minutes) after (or before) the alarm time, to gradually reduce the natural light levels in the room. As in the case of the simulated sunrise, the simulated sunset can be a slow, continuous or gradual shade closing over a predetermined period, or a sequence of discrete shade closing steps at spaced intervals throughout the period.

Although FIGS. 3 and 3A-3G show an example in which a table lamp is controlled, other embodiments use the dimmer commands to control other types of lighting, such as ceiling fixtures and track lighting.

Figure 4:
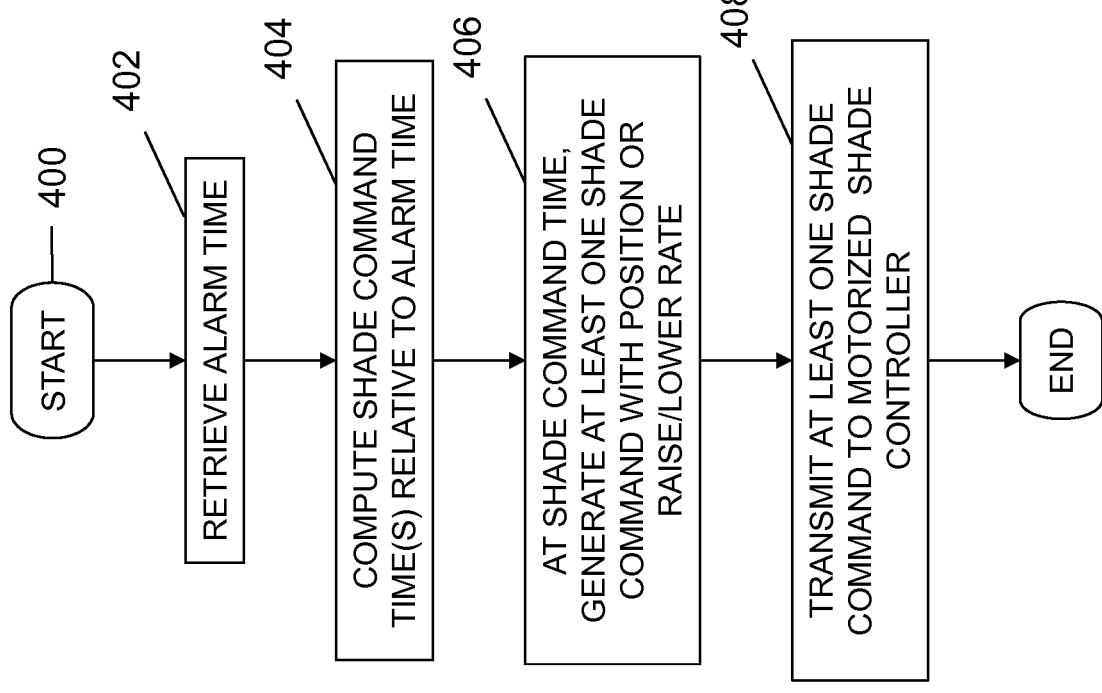
FIG. 4 is a flow chart of a method performed by the clock of FIG. 1.

FIG. 4 is a flow chart of the operation of an embodiment of a clock 100, under control of the processor 130.

At step 400, the sequence starts. A sunrise event is initiated by actuating the sunrise control 108, or a sunset event is initiated by actuating the sunset control 106.

At step 402, the processor 130 retrieves the alarm time from its non-transitory storage medium. The alarm time is input by the user as described above.

At step 404, the processor 130 computes at least one shade command time relative to the alarm time. For example, in some embodiments, a single shade command time at a default interval (e.g., 20 or 30 minutes) before the alarm time is selected. In other embodiments, the clock 100 includes controls which the user can use to input the interval and/or the number of steps used to gradually increase the shade opening. The clock 100 thus generates a set of one or more command times.

At step 406, at each shade command time, the processor 130 generates at least one shade command to be transmitted to the motorized shade, identifying a shade motor movement (corresponding to a position of the bottom of the shade) or a shade motor rotation rate (corresponding to a rate of raising or lowering the shade) using the apparatus shown in FIG. 1B.

At step 408, the clock 100 transmits at least one shade command to the controller in the EDU 206 of the motorized shade 202 to cause the shade to be raised or lowered.

Figure 5:
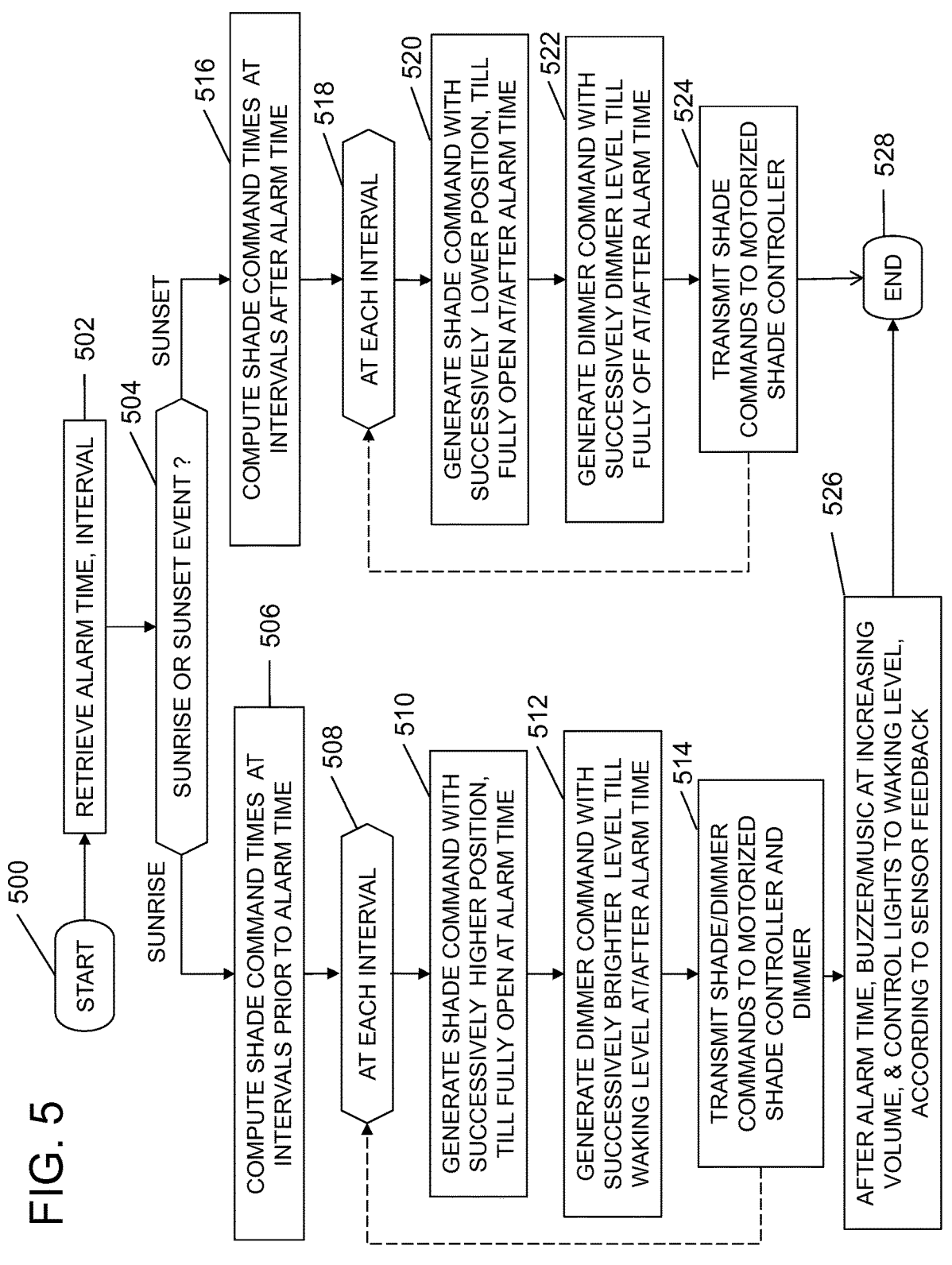
FIG. 5 is a flow chart of another example of a method performed by the clock of FIG. 1.

FIG. 5 is a more detailed flow chart showing operation according to certain embodiments. Thus, FIG. 5 is an example, and does not limit the range of embodiments encompassed by FIG. 4.

At step 500 the sequence starts. A sunrise event is initiated by actuating the sunrise control 108, or a sunset event is initiated by actuating the sunset control 106. In the example of FIG. 5, the lighting control 112 is also activated.

At step 502, At step 402, the processor 130 retrieves the alarm time from its non-transitory storage medium. The alarm time and the length of the interval between initiation of shade movements, and/or number of shade movements is input by the user as described above. In some embodiments, the system only uses one interval, and the user inputs the length for the sunrise event. In the example of FIG. 5, the user inputs both the interval length and number of intervals (e.g., 6 intervals, 5 minutes each, as shown in FIG. 3).

At step 504, a determination is made whether a sunrise event or sunset is being performed. For a sunrise event, steps 506-514 are performed. For a sunset event, steps 516-524 are performed.

At step 506, the processor 130 computes one or more shade command times relative to the alarm time.

At step 508, a loop is performed for each interval, beginning at a time which precedes the alarm time by the product of the interval length and the number of intervals.

At step 510, at each of the one or more shade command times, the processor 130 generates a shade command to be transmitted to the motorized shade for causing the shade to be raised, using the apparatus shown in FIG. 1B.

At step 512, at each of the one or more shade command times, the processor 130 generates a shade command to be transmitted to the processor controlled switch/dimmer 220 for causing the light levels to be increased. In some embodiments, clock 100 transmits the dimmer commands in each interval immediately before or after the shade command(s) are transmitted. In other embodiments, the dimmer commands are not synchronized with the shade commands.

At step 514, the clock 100 transmits the shade commands to the motorized shade controller, and the dimmer commands to the dimmer controller.

At step 526, after the alarm time, the auditory alarm (e.g., buzzer or music) is sounded at a volume that increases over time, and the lights are controlled based on feedback from the light sensor 128 or 208 to maintain illumination at a waking level (even if the outdoor skies grow cloudy).

At step 516, the processor 130 computes one or more shade command times after to the alarm time. Thus, the user specifies when the simulated sunset begins, instead of its end time.

At step 518, a loop is performed for each interval, beginning the alarm time and ending at a time which precedes the alarm time by the product of the interval length and the number of intervals.

At step 520, at each of the one or more shade command times, the processor 130 generates a shade command to be transmitted to the motorized shade for causing the shade to be lowered, using the apparatus shown in FIG. 1B.

At step 522, at each of the one or more shade command times, the processor 130 generates a shade command to be transmitted to the processor controlled switch/dimmer 220 for causing the light levels to be decreased. In some embodiments, clock 100 transmits the dimmer commands in each interval immediately before or after the shade command(s) are transmitted. In other embodiments, the dimmer commands are not synchronized with the shade commands.

At step 524, the clock 100 transmits the shade commands to the motorized shade controller, and the dimmer commands to the dimmer controller.

At step 528, the sequence ends.

Figure 6:
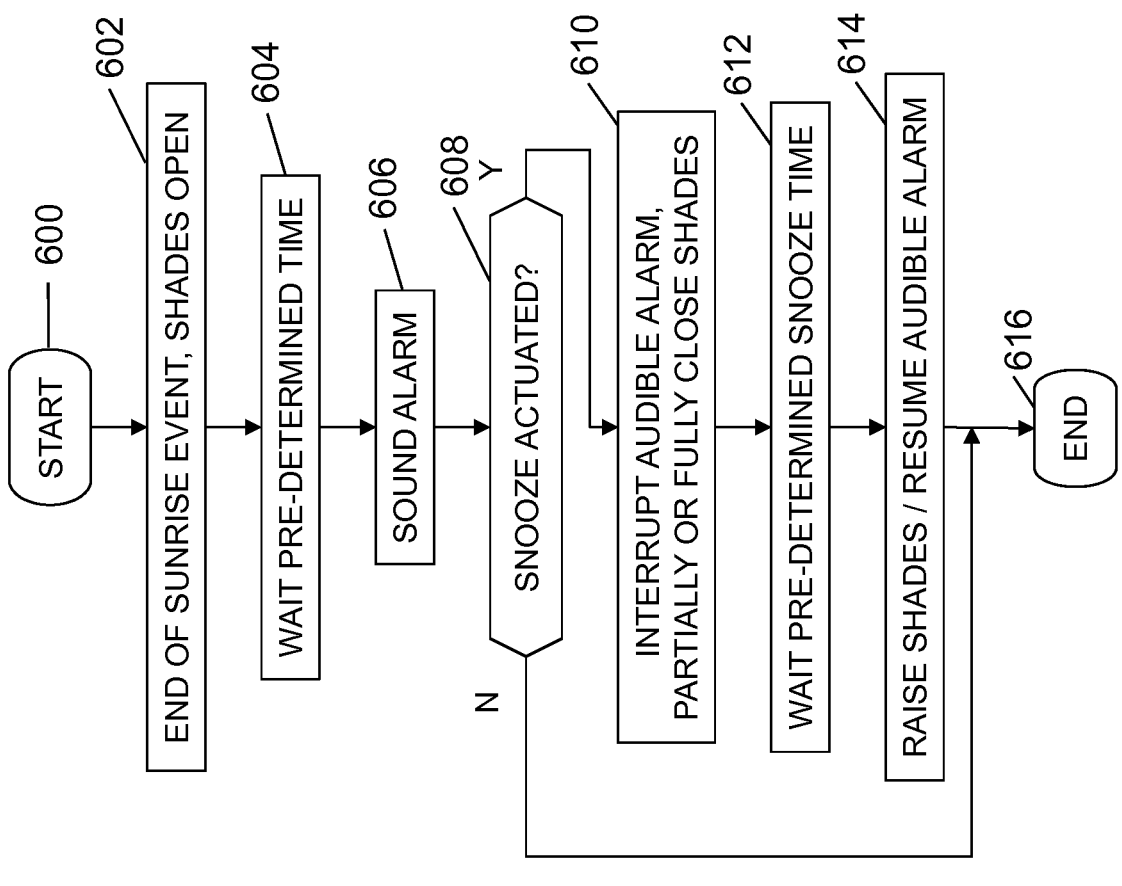
FIG. 6 is a flow chart of a snooze sequence performed using the clock of FIG. 1.

FIG. 6 is a flow chart showing the operation of the snooze function when the sunrise control 108 is activated.

The operation begins at step 600, when control 108 and is turned on.

At step 602, at the end of the sunrise event (i.e., at the alarm time), the shades are in their fully open position.

At step 604, the clock 100 waits for a predetermined period, and allows the user to awaken gradually from the natural and/or electrical lights, without any jarring sounds.

At step 606, if the user has not turned off the alarm within a predetermined period after the alarm time, the audible alarm (e.g., buzzer or music) is sounded.

At step 608, if the snooze control 116 on the housing 102 of clock 100, is actuated, or if a snooze signal from an external remote control device 210 (FIG. 2) is received, steps 610-614 are performed. Otherwise, steps 610-614 are skipped.

At step 610, activation of the snooze control 116 (or a signal from remote control 210) interrupts the audible alarm. In some embodiments, the processor 130 further responds to actuation of the snooze control 116 or receipt of the snooze signal from remote control device 210 by moving the motorized window shade 204 to a snooze position for a predetermined period (which can be the same as the alarm snooze period, or shorter).

At step 612, the processor waits for a predetermined period (e.g., 9 or 10 minutes), without issuing additional shade positioning commands At step 614, the audible alarm resumes, and returns the motorized window shade to the open position (if closed) when the predetermined period has ended.

At step 616, the sequence ends.

In some embodiments, the clock is configured to interface to a mobile device, and the mobile device provides a graphical user interface (GUI), with which the user can input the parameters for the sunrise and/or sunset events.

Figure 7:
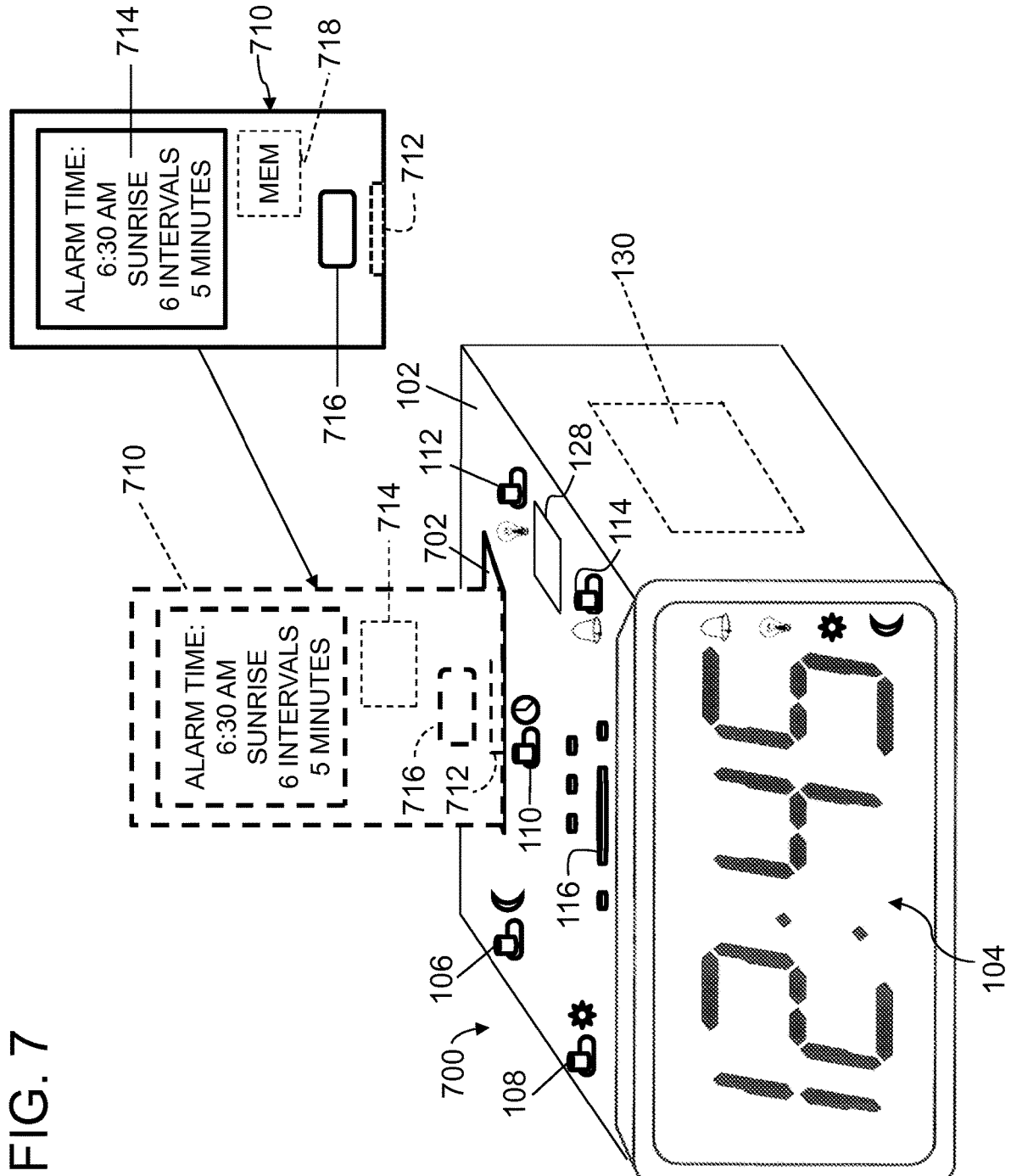
FIG. 7 is an isometric view of an embodiment of the clock with a docking port for a mobile device.

FIG. 7 shows another embodiment of a clock 700, which is similar to the clock 100 of FIG. 1A, except that the clock 700 further comprises an interface (e.g., a mobile device dock 702 configured to connect to a port 712 of a of a mobile device 710) The mobile device 710 can be a smart phone, tablet, mini-tablet or the like. The wired mobile device dock 702 is configured with a standard connector and interface for a particular mobile device type, such as an iPhone (by Apple Corporation of Cupertino, Calif., or a "ATIV S" Windows phone (sold by Samsung Corporation of Seoul, KR) or an Android based phone, such as a "GALAXY" phone sold by Samsung Corporation of Seoul, KR. In FIG. 7, the mobile device 710 is shown in phantom in its position connected to the dock 702 of the clock 700. Other elements of clock 700 which are the same as those of claim 1 are indicated by like reference numerals. For brevity, descriptions of these items are not repeated.

The mobile device 710 is configured with a display 714, a non-transitory storage medium, such as flash memory, and one or more hard control 716 or soft control. The mobile device 710 is configured to provide a graphical interface to a user for entering the alarm time, such that when the mobile device is connected to the mobile device interface, the clock receives the alarm time from the mobile device. In some embodiments, the mobile device has stored in its memory an application for inputting the data input parameters used by the clock 100, as discussed above (e.g., alarm time, whether a sunrise or sunset event is to be scheduled, the number of intervals (between shade movements), and the duration of each interval. The processor 130 is configured to detect when the mobile device 710 is connected to the interface (e.g., dock), and request and receive the alarm time from the device, event type, number of intervals, and or duration of each interval from the mobile device 710 upon detecting that the mobile device is connected to the dock.

FIG. 8 is diagram of an alternative embodiment of the clock, which is similar to the clock 700, except that both the clock 800 and the mobile device 710 have a wireless communications interface, such as an IEEE 802.11 (WiFi) wireless local area network interface 802 in the clock 800, and a WiFi interface 720 in the mobile device 710. Other wireless communications interfaces, such as RF (e.g., Lutron Clear Connect protocol) or Bluetooth may be substituted. The clock 800 can use the received signal strength indication (RSSI) of the signals received from the mobile device 710 to detect that the mobile device 710 is in close proximity, and request the input parameters from the mobile device 710.

In both the wired interface example of FIG. 7 and the wireless interface example of FIG. 8, the clock 700 (800) can be configured to input and store an internal alarm time in the clock; and the processor 130 is configured to generate the at least one shade positioning command and/or light positioning command at the internal alarm time, if the processor 130 does not detect any mobile device 710 connected to the dock, or having sufficient RSSI to be within close enough proximity for a wireless connection.

FIG. 9 is a flow chart showing operation of the clock 700 (800) which interfaces to a mobile device.

At step 900 the operation begins.

At step 902, a determination is made whether the mobile device 710 is coupled to the clock 700 (800), by docking to a wired port 702 on the clock, or by moving the mobile device to within proximity of the clock.

At step 904 if there is no mobile device coupled to the clock, the clock retrieves the internal alarm time stored in its memory (as described above with reference to FIG. 1A).

At step 906, if the mobile device is coupled to the clock 700 (800), the clock receives the alarm time, event type (sunrise or sunset) interval length, and number of intervals from the mobile device.

At step 908, the clock 700 (800) computes one or more shade command time prior to the alarm time.

At step 910, at each shade command time, the processor 130 generates a shade command with a successively higher or lower position.

At step 912, at each dimmer command time, the processor 130 generates a dimmer command with a successively brighter or dimmer level.

At step 914, the processor transmits the commands to the motorized shad controller and dimmer.

At step 916, in some embodiments, at the alarm time, the mobile device plays music stored in the mobile device, through a speaker of the clock 700, 800.

Figure 10:
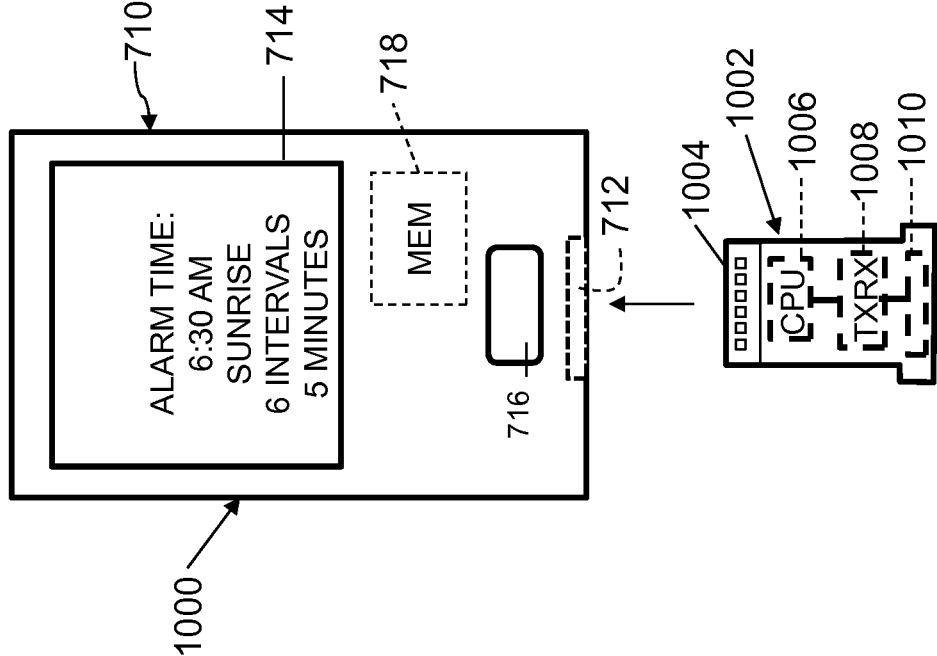
FIG. 10 is a diagram of another embodiment including a mobile device and a dongle.

FIG. 10 shows another embodiment. In FIG. 10, the clock apparatus 1000 comprises a mobile device 710 configured with an alarm clock function capable of receiving an input alarm time. The mobile device 710 has an input/output (I/O) port 712 or earphone port.

The apparatus further includes a dongle 1002 comprising a connector 1004 adapted to connect to the I/O port 712 or earphone port of the mobile device 710 and communicate with the mobile device, a radio frequency (RF) transceiver 1008, and an RF antenna 1010 coupled to the RF transceiver. A processor 1006 in the dongle 1002 is coupled to the connector 1004 and the RF transceiver 1008. The processor 1006 in the dongle 1002 is configured to receive the alarm time, event type (sunrise or sunset), interval length between shade movements and number of intervals from the mobile device 714, and generate at least one shade positioning command to be transmitted to at least one motorized window shade 2004 via the RF transceiver 1008 and the RF antenna 1010, so as to cause the motorized window shade 204 to move to one or more position (or move at a particular rate) at one or more corresponding predetermined interval relative to the alarm time. In other embodiments (not shown), the dongle is adapted to connect to the earphone port (not shown) of the mobile device 710.

Thus, the embodiment of FIG. 10 uses the GUI of the mobile device as an alternative input mechanism, in place of the hardware controls on the housing of the clock 100. In some embodiments, the software functions for computing command times, generating and transmitting shade and dimmer commands are all stored in the dongle, and the software functions for activating an audible alarm are stored in the mobile device.

Other elements of the dongle 1002 (e.g., memory, codec, bus and the like are understood by those of ordinary skill to be present, but are not described in detail herein for brevity.

In other embodiments, the dongle 1002 provides the hardware (CPU 1006, transceiver 1008 and antenna 1010 for communicating with the motorized shade controller, and the mobile device 710 has an integrated app for computing command times, generating and transmitting shade and dimmer commands and activating an audible alarm.

In other embodiments (not shown), the processor 1006 of the dongle 1002 is configured to generate and transmit dimmer commands to a processor controlled switch dimmer, in the manner described above with respect to the clock. Thus, all the operations described above with reference to FIGS. 5 and 6 can be performed using the combination of the mobile device 710 and the dongle.

FIG. 11 is a flow chart of the operation of the apparatus of FIG. 10.

At step 1100, operation begins any time the user enters an alarm time in the sunrise/sunset app in the GUI of the mobile device.

At step 1102, the processor 130 checks whether the dongle 1002 is connected to the mobile device 710. If the dongle 1002 is connected, steps 1106-1116 are performed. If the dongle 1002 is not connected, step 1104 is performed.

At step 1104, if the dongle is not connected, then in some embodiments, the mobile device uses the alarm time stored in the mobile device as a regular audio alarm time (The sunrise event or sunset event is not performed by the mobile device alone, without the dongle 1002.

In other embodiments, if the dongle is not connected, the mobile device 710 searches for another gateway device that is capable of transmitting commands to motorized shades and/or lights. The mobile device can then issue shade and/or dimmer commands via the other gateway device.

At step 1106, in some embodiments, the dongle 1106 receives the alarm time, event type, interval length, and number of intervals from the mobile device 710 via the I/O port or earphone port 712 and connector 1004.

At step 1108, the dongle computes the shade command times and/or dimmer command times prior to the alarm time.

At step 1110, for each shade command time, the dongle generates a respective shade command, and if there are plural shade commands, each has a successively higher position for a sunrise event, or lower level for a sunset event.

At step 1112, for each dimmer command time, the dongle generates a respective dimmer command, and if there are plural dimmer commands, each has a successively brighter level for a sunrise event, or dimmer level for a sunset event.

At step 1114, the dongle 1002 transmits the commands to the motorized shade controller and dimmer.

Figure 12:
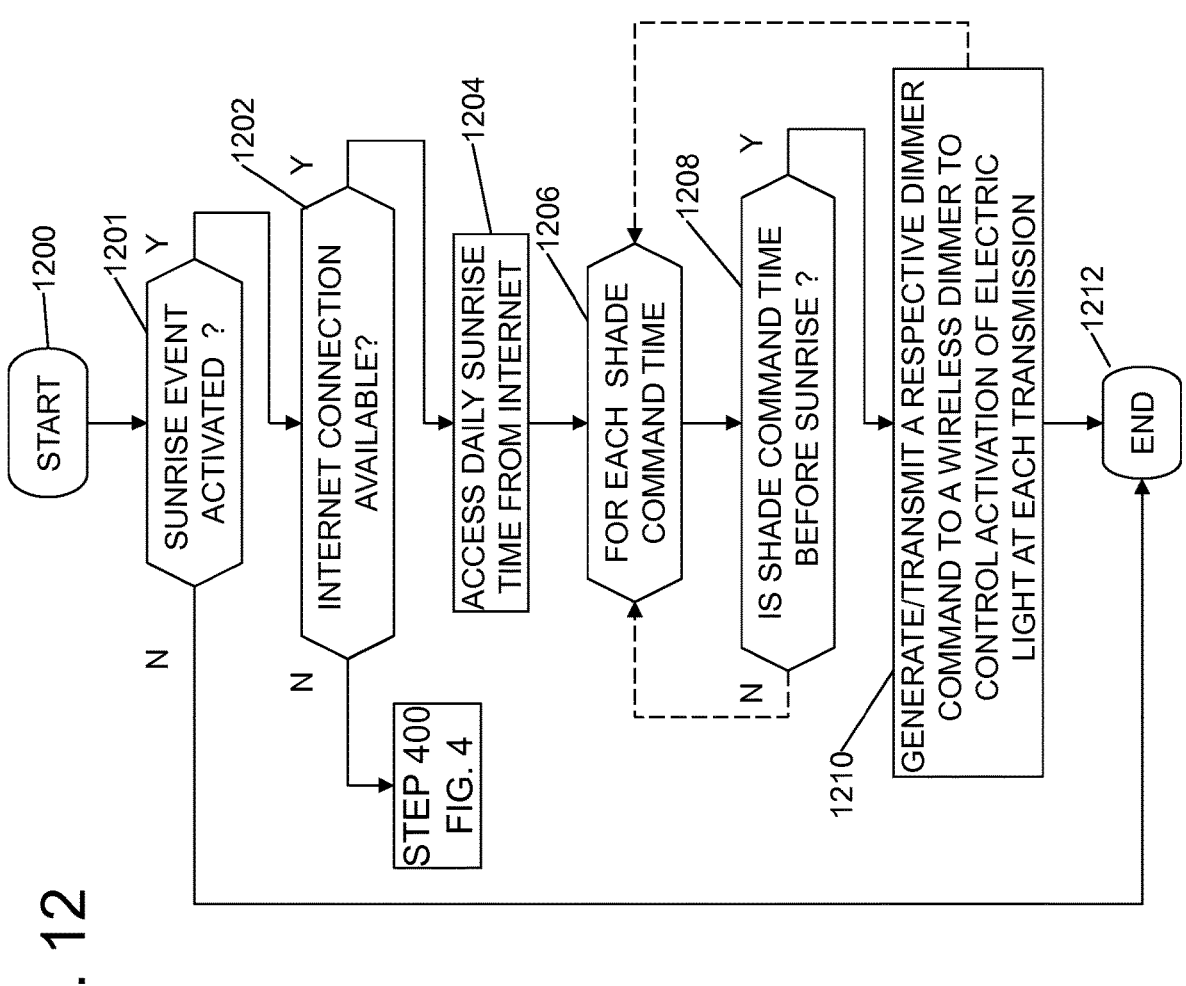
FIG. 12 is a flow chart of a procedure for activating electrical lights if the user programs the clock to perform a sunrise event using shades, and the alarm time is before dawn.

FIG. 12 is a flow chart of an additional feature that can be implemented in some embodiments. The clock 100 allows the user to activate a sunrise event regardless of the time of day. In some such as those described above, the user wishes to wake up to a natural sunrise after the sun is high in the sky. In other cases, a user may attempt to program the clock 100 for a sunrise event and without being aware that the alarm time is early than the actual sunrise. For example, the user may activate the sunrise event control 108 (without activating the lighting control 112) and set the alarm time for 5 AM on a day when the sun rises at 6 AM. In that situation, the clock 100 will open the shades, but there is no daylight. In some embodiments, the processor 130 automatically detects this situation, and takes corrective action by generating and transmitting lighting commands.

At step 1200, the process begins.

At step 1201, a determination is made whether the sunrise event is activated. If so, step 1202 is performed. If not, the routine ends at step 1212.

At step 1202, a determination is made whether an internet connection is available. For example, the clocks 700, 800 can access the internet through the mobile device 710 while the mobile device is coupled to clock. Alternatively, the clocks 100, 700, 800 can be associated with another device that has internet access, such as a "RADIORA® 2" control system sold by Lutron Electronics Co., Inc. If Internet access is available, step 1204 is performed. Otherwise, the routine returns to step 400 of FIG. 4 and performs the sunrise sequence described above.

At step 1204, the clock retrieves the local sunrise time from a predetermined Internet source.

At step 1206, a loop is performed for each shade command time, including steps 1208 and 1210.

At step 1208, for each shade command time computed by the clock (in the processes of FIG. 4 or 5, for example) the processor 130 compares the computed shade command time with the actual local sunrise time retrieved from the Internet. If the shade command time is earlier than actual sunrise, step 1210 is performed. Otherwise, the loop continues with the next shade command time.

At step 1210, the processor generates and transmits a respective dimmer command to the dimmer control 220 (which may be in wireless communication with the clock). The dimmer command controls activation of the electric light at the shade command time (even if the user has not activated the lighting control 112). This ensures that the user can wake up gently to light instead of the audible alarm.

At step 1212, the routine ends.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A control apparatus communicatively couplable to a portable electronic device, the control apparatus comprising:
   a portable electronic device interface, the portable electronic device interface to enable a direct communicative coupling between the control apparatus and the host portable electronic device;
   wireless communication interface circuitry;
   electrical load control circuitry to, while communicatively coupled to the portable electronic device:
      receive a first message from the portable electronic device, wherein the first message includes data representative of:
         an alarm time;
         an event type;

an interval length between shade movements; and
         a number of intervals;
      responsive to the receipt of the first message and prior to the received alarm time, autonomously determine respective ones of a plurality of window treatment command times, each determined based on the received alarm time, event type, interval length between shade movements, and number of intervals;
      at each of the determined plurality of shade window treatment command times, generate at least one command to cause a window treatment to travel to a position to adjust an amount of ambient light passed by the window treatment; and
      transmit, via the wireless communication interface circuitry, the generated at least one command to the window treatment at each of the plurality of window treatment command times.

2. The control apparatus of claim 1 wherein to generate the at least one command to cause the window treatment to adjust the amount of ambient light passed by the window treatment the electric load control circuitry to further:
   generate the at least one command to cause the window treatment to travel to a position to increase the amount of ambient light passed by the window treatment at each of the plurality of shade command times.

3. The control apparatus of claim 2 wherein to generate the at least one command to cause the window treatment to travel to the position to increase the amount of ambient light passed by the window treatment at each of the plurality of window treatment command times, the control circuitry to further:
   generate the at least one command to cause the window treatment to continuously increase the amount of ambient light passed by the window treatment between each of the plurality of window treatment command times.

4. The control apparatus of claim 2 wherein to generate the at least one command to cause the window treatment to increase the amount of ambient light passed by the window treatment at each of the plurality of window treatment command times, the control circuitry to further:
   generate the at least one command to cause the window treatment to stepwise increase the amount of ambient light passed by the window treatment between each of the plurality of window treatment command times.

5. The control apparatus of claim 1 wherein to generate the at least one command to cause the window treatment to adjust the amount of ambient light passed by the window treatment at each of the plurality of window treatment command times, the control circuitry to further:
   generate the at least one command to cause the window treatment to decrease the amount of ambient light passed by the window treatment at each of the plurality of window treatment command times.

6. The control apparatus of claim 5 wherein to generate the at least one command to cause the window treatment to decrease the amount of ambient light passed by the window treatment at each of the plurality of window treatment command times, the control circuitry to further:
   generate the at least one command to cause the window treatment to continuously decrease the amount of ambient light passed by the window treatment between each of the plurality of window treatment command times.

7. The control apparatus of claim 5 wherein to generate the at least one command to cause the window treatment to decrease the amount of ambient light passed by the window treatment at each of the plurality of window treatment command times, the control circuitry to further:

generate the at least one command to cause the window treatment to stepwise decrease the amount of ambient light passed by the window treatment between each of the plurality of window treatment command times.

8. The control apparatus of claim 1, the control circuitry to further:

determine one or more dimming command times prior to the received alarm time;

generate at least one dimming command to cause a lighting load to adjust a light output intensity at each of the one or more dimming command times; and transmit, via the wireless communication interface circuitry, the generated at least one dimming command to the lighting load at each of the one or more dimming command times.

9. A method of automatically simulating a sunrise or sunset condition using a control apparatus communicatively couplable to a host portable electronic device, the method comprising, while communicatively coupled to the portable electronic device:

receive a first message from the portable electronic device, wherein the first message includes data representative of:

an alarm time;

an event type;

an interval length between shade movements; and a number of intervals; and responsive to the receipt of the first message and prior to the received alarm time, autonomously:

determining, by electric load control circuitry, respective ones of a plurality of window treatment command times, each determined based on the received alarm time, event type, interval length between shade movements, and number of intervals;

generating, by electric load control circuitry at each of the determined plurality of window treatment command times, at least one command to cause a window treatment to travel to a position to adjust an amount of ambient light passed by the window treatment; and transmitting, by the electric load control circuitry via a communicatively coupled wireless communication interface circuitry, the generated at least one command to the window treatment at each of the plurality of window treatment command times.

10. The method of claim 9 wherein generating the at least one command to cause the window treatment to adjust the amount of ambient light passed by the window treatment, further comprises generating, by the electric load control circuitry, the at least one command to cause the window treatment to travel to a position to increase the amount of ambient light passed by the window treatment at each of the plurality of window treatment command times.

11. The method of claim 10 wherein generating the at least one command to cause the window treatment to travel to the position to increase the amount of ambient light passed by the window treatment at each of the plurality of window treatment command times, further comprises:

generating, by the electric load control circuitry, at least one command to cause the window treatment to continuously increase the amount of ambient light passed by the window treatment at each of the plurality of window treatment command times.

12. The method of claim 10 wherein generating the at least one command to cause the window treatment to travel to the position to increase the amount of ambient light passed by the window treatment at each of the plurality of window treatment command times, further comprises:

generating, by the electric load control circuitry, the at least one command to cause the window treatment to stepwise increase the amount of ambient light passed by the window treatment between each of the plurality of window treatment command times.

13. The method of claim 9 wherein generating the at least one command to cause the window treatment to adjust the amount of ambient light passed by the window treatment at each of the plurality of window treatment command times, further comprises:

generating, by the electric load control circuitry, the at least one command to cause the window treatment to decrease the amount of ambient light passed by the window treatment at each of the plurality of window treatment command times.

14. The method of claim 13 wherein generating the at least one command to cause the window treatment to decrease the amount of ambient light passed by the window treatment at each of the plurality of window treatment command times, further comprises:

generating, by the electric load control circuitry, the at least one command to cause the window treatment to continuously decrease the amount of ambient light passed by the window treatment between each of the plurality of window treatment command times.

15. The method of claim 13 wherein generating the at least one command to cause the window treatment to decrease the amount of ambient light passed by the window treatment at each of the plurality of window treatment command times, further comprises:

generating, by the electric load control circuitry, the at least one command to cause the window treatment to stepwise decrease the amount of ambient light passed by the window treatment between each of the plurality of window treatment command times.

16. The method of claim 9, further comprising:

determining, by the electric load control circuitry, one or more dimming command times prior to the received alarm time;

generating, by the electric load control circuitry, at least one dimming command to cause a lighting load to adjust a light output intensity at each of the one or more dimming command times; and transmit, via the wireless communication interface circuitry, the generated at least one dimming command to the lighting load at each of the one or more dimming command times.

17. A non-transitory, machine-readable, storage device that includes instructions that, when executed by electric load control circuitry disposed in a control apparatus communicatively couplable to a host portable electronic device, causes the electric load control circuitry to, while communicatively coupled to the portable electronic device:

receive, a first message from the portable electronic device, wherein the first message includes data representative of:

an alarm time;

an event type;

an interval length between shade movements; and a number of intervals; and responsive to the receipt of the first message and prior to the received alarm time:

autonomously determine respective ones of a plurality of window treatment command times, each determined based on the received alarm time, event type, interval length between shade movements, and number of intervals;

at each of the determined plurality of window treatment command times, generate at least one command to cause a window treatment to travel to a position to adjust an amount of ambient light passed by the window treatment at each of the one or more shade command times; and transmit, via a communicatively coupled wireless communication interface circuitry, the generated at least one command to the window treatment at each of the plurality of window treatment command times.

18. The non-transitory, machine-readable, storage device of claim 17 wherein the instructions that cause the electric load control circuitry to generate the at least one command to cause the window treatment to adjust the amount of ambient light passed by the window treatment, further causes the electric load control circuitry to:

generate the at least one command to cause the window treatment to travel to a position to increase the amount of ambient light passed by the window treatment at each of the plurality of window treatment command times.

19. The non-transitory, machine-readable, storage device of claim 18 wherein the instructions that cause the electric load control circuitry to generate the at least one command to cause the window treatment to travel to the position to increase the amount of ambient light passed by the window treatment at each of the plurality of window treatment command times, further causes the electric load control circuitry to:

generate at least one command to cause the window treatment to continuously increase the amount of ambient light passed by the window treatment between each of the plurality of window treatment command times.

20. The non-transitory, machine-readable, storage device of claim 18 wherein the instructions that cause the electric load control circuitry to generate the at least one command to cause the window treatment to increase the amount of ambient light passed by the window treatment at each of the plurality of window treatment command times, further causes the electric load control circuity to:

generate the at least one command to cause the window treatment to stepwise increase the amount of ambient light passed by the window treatment between each of the plurality of window treatment command times.

21. The non-transitory, machine-readable, storage device of claim 17 wherein the instructions that cause the electric load control circuitry to generate the at least one command to cause the window treatment to adjust the amount of ambient light passed by the window treatment at each of the plurality of window treatment command times, further causes the electric load control circuitry to:

generate the at least one command to cause the window treatment to decrease the amount of ambient light passed by the window treatment at each of the plurality of window treatment command times.

22. The non-transitory, machine-readable, storage device of claim 21 wherein the instructions that cause the electric load control circuitry to generate the at least one command to cause the window treatment to decrease the amount of ambient light passed by the window treatment at each of the plurality of window treatment command times, further causes the electric load control circuitry to:

generate the at least one command to cause the window treatment to continuously decrease the amount of ambient light passed by the window treatment between each of the plurality of window treatment command times.

23. The non-transitory, machine-readable, storage device of claim 21 wherein the instructions that cause the electric load control circuitry to generate the at least one command to cause the window treatment to decrease the amount of ambient light passed by the window treatment at each of the plurality of window treatment command times, further causes the electric load control circuitry to:

generate the at least one command to cause the window treatment to stepwise decrease the amount of ambient light passed by the window treatment between each of the plurality of window treatment command times.

24. The non-transitory, machine-readable, storage device of claim 17 wherein the instructions, when executed by the electric load control circuitry, further causes the electric load control circuitry to:

determine one or more dimming command times prior to the received alarm time;

generate at least one dimming command to cause a lighting load to adjust a light output intensity at each of the one or more dimming command times; and cause the wireless communication interface circuitry to transmit the generated at least one dimming command to the lighting load at each of the one or more dimming command times.

* * * * *